(12) United States Patent
Gupta et al.

(10) Patent No.: US 10,652,787 B2
(45) Date of Patent: May 12, 2020

(54) SYSTEMS AND METHODS FOR RESOLVING A PHYSICAL CELL IDENTITY CONFUSION IN A HETEROGENEOUS NETWORK

(71) Applicant: RELIANCE JIO INFOCOMM LIMITED, Mumbai (IN)

(72) Inventors: Ajay Kumar Gupta, Pune (IN); Vishal Vasant Oak, Bangalore (IN)

(73) Assignee: RELIANCE JIO INFOCOMM LIMITED, Mumbai (IN)

( * ) Notice: Subject to any disclaimer, the term of this patent is extended or adjusted under 35 U.S.C. 154(b) by 130 days.

(21) Appl. No.: 16/068,346

(22) PCT Filed: Feb. 2, 2017

(86) PCT No.: PCT/IB2017/050564
§ 371 (c)(1),
(2) Date: Jul. 5, 2018

(87) PCT Pub. No.: WO2017/134593
PCT Pub. Date: Aug. 10, 2017

(65) Prior Publication Data
US 2019/0007870 A1    Jan. 3, 2019

(30) Foreign Application Priority Data
Feb. 4, 2016 (IN) .............................. 201621004014

(51) Int. Cl.
*H04W 36/00* (2009.01)
*H04W 84/04* (2009.01)
*H04W 36/08* (2009.01)

(52) U.S. Cl.
CPC ........ *H04W 36/0061* (2013.01); *H04W 36/08* (2013.01); *H04W 84/042* (2013.01); *H04W 84/045* (2013.01)

(58) Field of Classification Search
CPC .......... H04W 36/0061; H04W 84/042; H04W 36/08; H04W 84/045
See application file for complete search history.

(56) References Cited

U.S. PATENT DOCUMENTS

| | | | |
|---|---|---|---|
| 9,049,581 B2* | 6/2015 | Agashe | H04W 36/0061 |
| 2009/0132675 A1* | 5/2009 | Horn | H04W 48/08 709/207 |
| 2014/0087735 A1* | 3/2014 | Vikberg | H04W 36/0011 455/436 |

OTHER PUBLICATIONS

International Search Report for PCT/IB2017/050564 dated May 4, 2017.

(Continued)

*Primary Examiner* — Shahriar Behnamian
(74) *Attorney, Agent, or Firm* — Ladas & Parry, LLP (57) ABSTRACT

Embodiment of the present disclosure relates to resolving physical cell identity confusion in heterogenous networks. In one embodiment, a method is disclosed, comprising: receiving a handover request including a first physical cell identity of a first target base station [120A]; comparing the first physical cell identity with a neighbour list comprising the first physical cell identity of the first target base station [120A] and a second physical cell identity of a second target base station [120B]; transmitting an identifier of an access point [130A, 130B, 130C, 130D] to the first target base station base stations [120A] and the second target base station [120B]; and analysing response messages received from each of the first target base stations [120A] and the second target base station [120B] for performing a handover from a serving base station [102] to one of the first target base station [120A] and the second target base station [120B].

10 Claims, 8 Drawing Sheets (56) References Cited

OTHER PUBLICATIONS

Written Opinion of the International Search Authority PCT/IB2017/050564 dated May 4, 2017.

* cited by examiner

SYSTEMS AND METHODS FOR RESOLVING A PHYSICAL CELL IDENTITY CONFUSION IN A HETEROGENEOUS NETWORK

CROSS-REFERENCE TO RELATED APPLICATIONS

This application is the U.S. national phase of PCT Application PCT/IB2017/050564 filed on Feb. 2, 2017, which, claims priority to Indian Patent Application No. 201621004014 filed on Feb. 4, 2016 which are incorporated herein by reference in their entireties.

TECHNICAL FIELD

Embodiments of the present disclosure generally relates to communication systems. More particularly, embodiments of the present disclosure relate to resolving physical cell identity confusion in heterogenous networks.

BACKGROUND

Currently, in an outgoing cellular deployment, suitable powered macro cells have been deployed to cover larger areas. However, the deployment of such macro cells does not manage to abate quick capacity degradation as the number of user equipment (UE) operating in the macro cells coverage areas increases. Therefore, cellular operators are now reinforcing the macro cells deployment along with one or multiple low powered small cellular cells (termed as Femto/Pico/Micro cells) placed at multiple strategic locations within one or more macro coverage areas and such arrangement of the macro cells along with the small cellular cells is termed as a Heterogeneous Networks or HetNets.

In a typical HetNet, the strategic locations for small cells generally include areas with high density of users, such as shopping malls, airports, railway/bus stations, colleges, etc. Also, these locations might include area with dead-spots, or areas with low macro cell signal strengths, such as indoor establishments or peripheral locations of the macro cell coverage area. The placement of the small cellular cells along with macro cells at multiple strategic locations as described above, results in HetNets that not only provides an increased mobile data capacity but also provide better mobile coverage and thereby enhancing the overall mobile broadband experience of the user.

In recent years, Wi-Fi technology based on IEEE 802.11 standards has also undergone tremendous growth and commercialization. Almost all available UE with cellular capability support have now Wi-Fi capability by default in order to connect to available Wi-Fi networks operating in the unlicensed frequency bands such as 2.4 GHz, or 5 GHz. Therefore, with technological augmentation, the cellular operators use universal and cost effective Wi-Fi technology in pursuing the HetNet deployment and implementation strategy. Many operators are now deploying low powered Wi-Fi cells along with cellular small cells at multiple strategic locations identified for the HetNet. Further, for ease of maintenance and provision, a few operators are also using Wi-Fi integrated versions of small cellular cells, wherein the Wi-Fi and the cellular small cell technology are made available on common equipment.

An exemplary case of a typical heterogeneous network comprises a macro base station for providing wide area coverage to service users. Within the macro cell coverage, several low power nodes are employed in service areas having a higher density of users requiring high data rates. Examples of such low power nodes comprise a first microcell and a second microcell in which the first microcell and the second microcell integrated with Wi-Fi radio are also used widely to provide multi technology hotspot capacity/coverage goals. The operators could also deploy sovereign & cost effective Wi-Fi Access points in hotspot areas to offload cellular load, and to meet capacity/coverage requirements of the users.

In the HetNet, the macro base station coverage could be used for wide area overlay mobility coverage, while micro base stations along with Wi-Fi Access points coverage could be used for mobile capacity upgrade. In a typical cellular deployment, where cellular cells are based on long-term evolution (LTE) specifications, laid out by the $3^{rd}$ generation partnership project (3GPP), each cellular cell (Macro/Micro/Pico/Femto) is identified by a physical cell identity (PCI) number at a radio layer. The PCI is used exclusively at radio layer procedures including neighboring cells measurements and reporting functions. At higher levels, a global cell identity (ECGI) is generally used to identify a cellular cell for scenarios, such as handover routing.

However, the total numbers of PCIs are limited in the LTE specification. For the LTE, primary and secondary synchronization signals together encode the different PCI of a LTE cell. The primary synchronization signal provides physical layer identity (0, 1, and 2) while the secondary synchronization signal provides the physical layer cell identity group (0, 1, 2 . . . 167). The total number of PCIs, in the LTE, is therefore limited to 504.

As there are a limited total number of PCIs in the LTE, the PCI allocation becomes a challenging task in the cellular deployment. Further, each cellular cell in the LTE system is required to be assigned a PCI that is different from the PCI of the neighbouring cells, so as to avoid PCI collision and PCI confusion scenarios in such cellular deployment.

The PCI collision occurs when two neighboring cells with overlapping coverage area share the same PCI. This is a serious problem since the user equipment in that overlapping area cannot distinguish between signals coming from the two neighbouring cells and thereby causing a loss of processing gain, synchronization issues, and high decoding errors.

The PCI confusion occurs when a PCI reuse happens among the neighbouring cells of the same cell. This leads to cell identification problem, where a serving cell is unable to uniquely identify the neighbour base stations by identifying the corresponding PCI associated with each neighbour base station. Thus, in an event a UE moves towards one of these neighbour base stations, the macro cell is unable to initiate a handover to the correct neighbour base station/cell.

Further, since there exists a limitation in terms of quantum of PCI space, the PCI allocation of every cellular cell whether macro or small cell becomes even more challenging in the HetNet deployment. Further, it is evident from the HetNet deployment that the PCI space could be reused among the small cell clusters within the macro coverage area since these are separate from each other; however, such a scheme of reuse could result in the PCI confusion state when the UE being served on the macro cell initially is being handed over to a small cell which is a part of small cell(s) cluster deployment under the macro cell coverage area.

Furthermore, there exists several known solutions to resolve the PCI confusion situations. A solution for resolving the PCI confusion is to let the UE provide more information to the serving base station enabling it to uniquely identify the target cell, for example by applying principles similar to automatic neighbour relation (ANR).

One such procedure is mentioned in 3GPP Technical Specification 36.300, and is called "inbound mobility to E-UTRAN CSG cells", where the UE is asked to read the E-CGI from the target neighbor cell to resolve a possible PCI confusion situation that arises while performing the handover to the target neighbor cell.

However, the frequent use of such ANR based procedure(s) may create interruption in the ongoing transmissions in the serving base station as UE requires long gaps to read E-CGI from the target cell. Also, it could possibly delay the handover process as the UE needs to fetch additional information from the target cell.

Moreover, with reference to related art, U.S. Ser. No. 14/115,810, such PCI confusion situation(s) is dealt by conveying extra information element (containing identifiers related to handover, such as cell radio network temporary identifier (C-RNTI), security settings, etc.) in the handover request message(s) to all the target base stations involved in the PCI confusion situation so that those target base stations send response message(s) with identical handover identifiers (as mentioned in the request message) to the serving base station. The serving base station thereafter would send one unique handover command (with commonly allocated handover identifiers known to all the target base stations ('Cell2' and 'Cell3') involved in PCI confusion situation) to the UE enabling it to perform handover to appropriate target base station. However, the proposed method requires overhead of maintaining a reserve space of handover identifiers (such as cell radio network temporary identifier (C-RNTI)) which are to be allocated by the serving base station to deal with PCI confusion situations. Further, since all the target base stations (i.e. the first micro cell and the second micro cell) are prepared for the handover in an event the PCI confusion arises, there is overhead of signalling towards unrequired target base station(s).

Accordingly, existing technologies do not solve the problems related to resolution of the PCI confusion arising in the HetNet during handover procedures so as to reuse the PCI space among various clusters of small cells operating under a designated macro cell coverage area.

SUMMARY

This section is provided to introduce certain objects and aspects of the present disclosure in a simplified form that are further described below in the detailed description. This summary is not intended to identify the key features or the scope of the claimed subject matter.

Embodiments of the present disclosure may relate to a serving base station [102] implemented in a heterogeneous network for resolving physical cell identity confusion while performing operations such as handover.

Embodiments of the present disclosure may relate to a method for resolving physical cell identity confusion, the method being performed by a serving base station [102], the method comprising: receiving a handover request from a user equipment [140], wherein the handover request includes a first physical cell identity of a first target base station [120A], and the user equipment is connected to the serving base station [102]; comparing the first physical cell identity with a neighbour list of the serving base station [102], wherein the neighbour list comprises the first physical cell identity of the first target base station [120A] and a second physical cell identity of a second target base station [120B]; receiving at least one identifier of at least one access point [130A, 130B, 130C, 130D] from the user equipment [140]; transmitting the at least one identifier to the first target base station [120A] and the second target base station [120B]; receiving a response message from each of the first target base station [120A] and the second target base station [120B] after transmitting the at least one identifier, wherein the response message comprises one of a positive response and a negative response based on a comparison of the at least one identifier; and analysing said response message for performing a handover from the serving base station [102] to one of the first target base station [120A] and the second target base station [120B] based on the positive response and the negative response received from the first target base station [120A] and the second target base station [120B].

Embodiments of the present disclosure may further relate to a serving base station [102] system for resolving physical cell identity confusion, the serving base station [102] comprising: receive a handover request from a user equipment [140], wherein the handover request includes a first physical cell identity of a first target base station [120A], and the user equipment [140] is connected to the serving base station [102], receive at least one identifier of at least one access point [130A, 130B, 130C, 130D] from the user equipment [140], transmit the at least one identifier to the first target base station [120A] and a second target base station [120B], receive a response message from each of the first target base station [120A] and the second target base station [120B] after transmitting the at least one identifier, wherein the response message comprises one of a positive response and a negative response based on a comparison of the at least one identifier; and an evaluation module configured to: compare the first physical cell identity with a neighbour list of the serving base station [120B], wherein the neighbour list comprises the first physical cell identity of the first target base station [120A] and a second physical cell identity of the second target base station [120B]; and analyse the response message for performing a handover from the serving base station [102] to one of the first target base station [120A] and the second target base station based [120B] on the positive response and the negative response received from the first target base station [120A] and the second target base station [120B].

Embodiments of the present disclosure may also relate to a method for resolving physical cell identity confusion, the method being performed by a user equipment [140], the method comprising: transmitting a handover request to a serving base station [102], wherein said handover request is transmitted after the user equipment [140] detects a first target base station [120A], said handover request includes a first physical cell identity of the first target base station [120A], and the user equipment [140] is connected to the serving base station [102]; and transmitting at least one identifier of at least one access point [130A, 130B, 130C, 130D] to the serving base station [102], wherein the serving base station [102] performs a handover from the serving base station [102] to one of the first target base station [120A] and a second target base station [120B] based on a positive response and a negative response received by the serving base station [102] from the first target base station [120A] and the second target base station [120B].

Embodiments of the present disclosure may also relate to a user equipment for resolving physical cell identity confusion, the user equipment [140] comprising: transmit a handover request to a serving base station [102], wherein said handover request is transmitted in an event the user equipment [140] detects of a first target base station [120A], said handover request includes a first physical cell identity of the first target base station [120A], transmit at least one identifier of at least one access point [130A, 130B, 130C, 130D]

to the serving base station [102], and the at least one access point [130A, 130B, 130C, 130D] is connected to one of the first target base station [120A] and a second target base station [120B]; and a measurement module configured to measure the at least one identifier of at least one of the first target base station [120A] and the second target base station [120B]; wherein the serving base station [102] performs a handover from the serving base station [102] to one of the first target base station [120A] and the second target base station [120B] based on a positive response and a negative response received from the first target base station [120A] and the second target base station [120B].

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present disclosure are described below, as illustrated in various drawings in which like reference numerals refer to the same parts throughout the different drawings.

Embodiments of the present disclosure provide systems and methods for enabling a serving base station [102] to resolve physical cell identity confusion when a user equipment [140] sends a handover request to the serving base station [102] including a physical cell identity of one of a first target base station [120A] and a second target base station [120B]. Further, the user equipment [140] may transmit at least one identifier of at least one access point [130A, 130B, 130C, 130D] to the serving base station [102].

Further, embodiment may relate to a method and system that enables the serving base station [102] to receive plurality of information including messages, herein after referred to as a "response message", from the first target base station [120A] and the second target base station [120B] when the serving base station [102] transmits the at least one identifier of the at least one access point [130A, 130B, 130C, 130D] to the first target base station [120A] and the second target base station [120B].

The user equipment [140] as used herein may include, but are not limited to, a mobile phone, a tablet, a phablet, a laptop, a desktop computer, a personal digital assistant (PDA), a set top box and any such device obvious to a person skilled in the art. Further, the user equipment [140] may comprise an input means such as a keyboard, an operating system, a memory unit, a display interface, etc.

Figure 1:
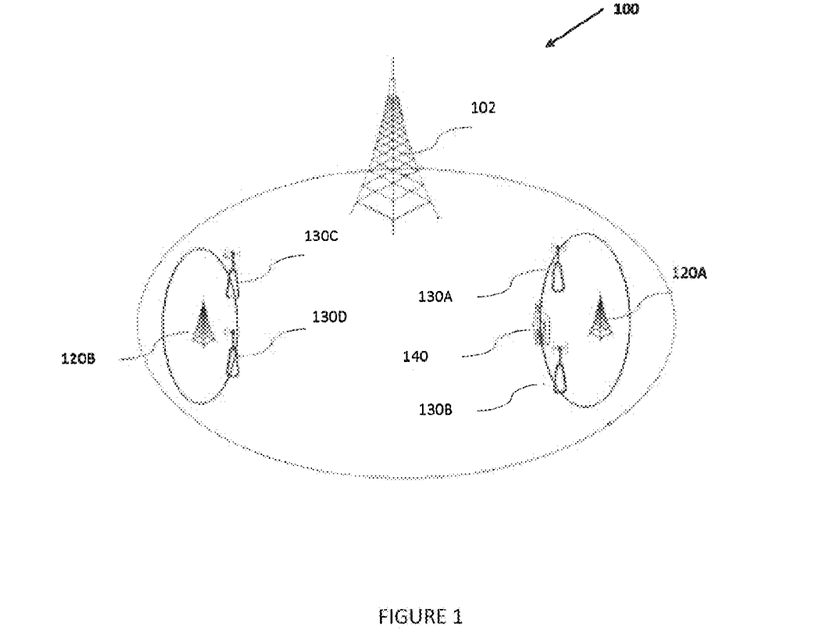
FIG. 1 illustrates system architecture of an exemplary heterogeneous network [100] for resolving physical cell identity confusion, in accordance with an embodiment of the present disclosure.

FIG. 1 illustrates an exemplary embodiment of the present disclosure which encompasses a system architecture for resolving physical cell identity confusion, the system [100] comprising: a serving base station [102], a user equipment [140], a first target base station [120A], a second target base station [120B], one or more access points [130A, 130B, 130C, 130D] connected to the first target base station [120A] and the second target base station [120B]. Further, in a preferred embodiment, the one or more access points [130A, 130B] may be connected to the first target base station [120A] and the one or more access points [130C, 130D] may be connected to the second target base station [120B]. The user equipment [140] can be configured to receive signal from the serving base station [102], wherein the user equipment [140] may be in communication to the serving base station [102]. In an event the user equipment [140] moves towards the first target base station [120A], the user equipment [140] may detect a signal from the at least one access point [130A, 130B] connected to the first target base station [120A]. Further, in an event the user equipment [140] detects the signal from the at least one access point [130A, 130B] connected to the first target base station [120A], beyond a predetermined threshold, the user equipment [140] may transmit a handover request to the serving base station [102] for performing a handover from the serving base station [102] to the first target base station [120A]. The handover request may further include a first physical cell identity of the first target cell [120A]. The first physical cell identity of the first target cell [120A] in an embodiment may be 102. Subsequently, the user equipment [140] may transmit one or more identifiers [BSSID1, HSSID1, ESSID1, explained in detail below] to the serving base station [102] in a measurement report. Therefore, in an event, the user equipment [140] detects a signal strength of the at least one access point [130A] connected to the first target base station [120A], the user equipment [140] may transmit identifiers [BSSID1, HSSID1, ESSID1] of the access point [130A] to the serving base station [102]. The one or more identifiers [BSSID1, HSSID1, ESSID1] may be transmitted to the serving base station [102], either periodically or in real-time. Alternatively, the one or more identifiers [BSSID1, HSSID1, ESSID1] may be transmitted alongside the handover request to the serving base station [102]. The one or more identifiers may comprise, but are not limited to, a basic service set identifiers (referred as BSSIDs), a heterogeneous extended service set identifier (referred as HSSIDs) and an extended service set identifiers (referred as ESSIDs) of the one or more one access points [130A, 130B, 130C, 130D].

Further, as illustrated in FIG. 1, the first target base station [120A] and the second target base station [120B] may be neighbour cells of the serving base station [102]. Thus, a neighbour list of the serving base station [102] may comprise information of the first physical cell identity (e.g. 102) of the first target base station [120A] and a second physical cell identity (e.g. 102) of the second target base station [120B]. In an embodiment, the neighbour list of the serving base station [102] may be maintained at the serving base station [102], as furnished below:
[First target base station [120A]—PCI:102]
[Second target base station [120B]—PCI:102]

On receiving the physical cell identity (e.g. 102) of the first target cell [120A] from the user equipment [140], the serving base station [102] may compare the first physical cell identity (e.g. 102) of the first target cell [120A] with the neighbour list of the serving base station [102]. In such instance, the first physical cell identity and the second physical cell identity is identical i.e. 102. Embodiment may relate to a scenario wherein the comparison result reveals that the serving base station [102] identifies the first physical cell identity (e.g. 102) received from the user equipment [140] matches with the neighbour list of the serving base station [102] having the same first physical cell identity (e.g. 102) of the first target base station [120A] and the second physical cell identity (e.g. 102) of the second target base station [120B]. As a result, the serving base station may detect a physical cell identity confusion which occurs due to similar physical cell identity of two or more neighbour base target stations.

After detecting the physical cell identity confusion, the serving base station [102] may transmit the one or more identifiers (BSSID1, HSSID1, ESSID1) received from the user equipment [140] to the first target base station [120A] and the second target base station [120B]. On receiving the one or more identifiers (BSSID1, HSSID1, ESSID1) from the serving base station [102], the first target base station [120A] may allocate a response message to the one or more identifiers (BSSID1, HSSID1, ESSID1) received from the serving base station [102]. Subsequently, the first target base station [120A] may compare the one or more identifiers (BSSID1, HSSID1, ESSID1) with a first neighbour list of the first target base station [120A].

In an embodiment, the access points [130A & 130B] may be neighbours of the first target base station [120A]. Following may be the first neighbour list maintained by the first target base station [120A] in an embodiment of this present disclosure:
[Access Point 130A—BSSID1, HSSID1, ESSID1]
[Access Point 130B—BSSID2, HSSID2, ESSID2]

If the one or more identifier (BSSID1, HSSID1, ESSID1) received from the user equipment [140] matches with the first neighbour list of the first target base station [120A], the first target base station [120A] may include the at least one identifier in the response message and transmit the response message as a positive response message to the serving base station [102]. Moreover, if the one or more identifiers (BSSID1, HSSID1, ESSID1) received from the user equipment [140] do not matches with the first neighbour list of the first target base station [120A], the first target base station [120A] may exclude the at least one identifier in the response message and transmit the response message which is an empty list, herein after referred to as negative response message, to the serving base station [102].

With reference to the above illustrated embodiment, the one or more identifiers (BSSID1, HSSID1, ESSID1) received from the user equipment [140] match with the first neighbour list of the first target base station [120A], the first target base station [120A] may transmit a positive response message to the serving base station [102] Including a non-empty list of identifiers (BSSID1, HSSID1, ESSID1) of access point [130A].

Similarly, the second target base station [120B], may allocate a response message to the one or more identifiers (BSSID1, HSSID1, ESSID1) received from the serving base station [102] and may compare the one or more identifiers (BSSID1, HSSID1, ESSID1) with a second neighbour list of the second target base station [120B].

Further, access points [130C & 130D] may be neighbours of the second target base station [120B]. Following may be the second neighbour list maintained by the second target base station [120B]:
[Access Point 130C—BSSID3, HSSID3, ESSID3]
[Access Point 130D—BSSID4, HSSID4, ESSID4]

If the one or more identifiers (BSSID1, HSSID1, ESSID1) received from the user equipment [140] matches with the second neighbour list of the second target base station [120B], then second target base station [120B] may include the at least one identifier in the response message and transmit the response message as positive response message to the serving base station [102]. Moreover, if the one or more identifiers (BSSID1, HSSID1, ESSID1) received from the user equipment [140] does not match with the second neighbour list of the second target base station [120B], the second target base station [120B] may exclude the at least one identifier in the response message and transmit the response message as negative response message to the serving base station [102]. Therefore, the positive response message may include a non-empty list of identifiers of one or more access points whereas the negative response message may include an empty list.

With reference to the above illustrated embodiment, the one or more identifiers (BSSID1, HSSID1, ESSID1) received from the user equipment [140] do not match with the second neighbour list of the second target base station [120B], the second target base station [120B] may transmit a negative response message to the serving base station [102] including an empty list.

The serving base station [102] may receive response messages from the first target base station [120A] and the second target base station [120B]. The response messages may include positive response message and negative response message. After receiving the response messages from each target base station, the serving base station [102] may start analysing the positive response message and negative response message received from the first target base station [120A] and the second target base station [120B]. As an exemplary embodiment, the serving base station [102] may receive the positive response message from the first target base station [120A] and the negative response message from the second target base station [120B]. After the serving base station [102] analyses the positive response message received from the first target base station [120A] with the non-empty list of identifiers (BSSID1, HSSID1, ESSID1) of access point [130A] and the negative response message from the second target base station [120B] with the empty list, the serving base station [102] may identify the first target base station [120A] as a target base station for which the user equipment [140] has sent the handover request indicating the first physical cell identity (i.e. 102) of the first target cell [120A]. Thereby, the serving base station [102] can resolve the physical cell identity confusion and can perform the handover of the user equipment [140] to the first target cell [120A].

Figure 2:
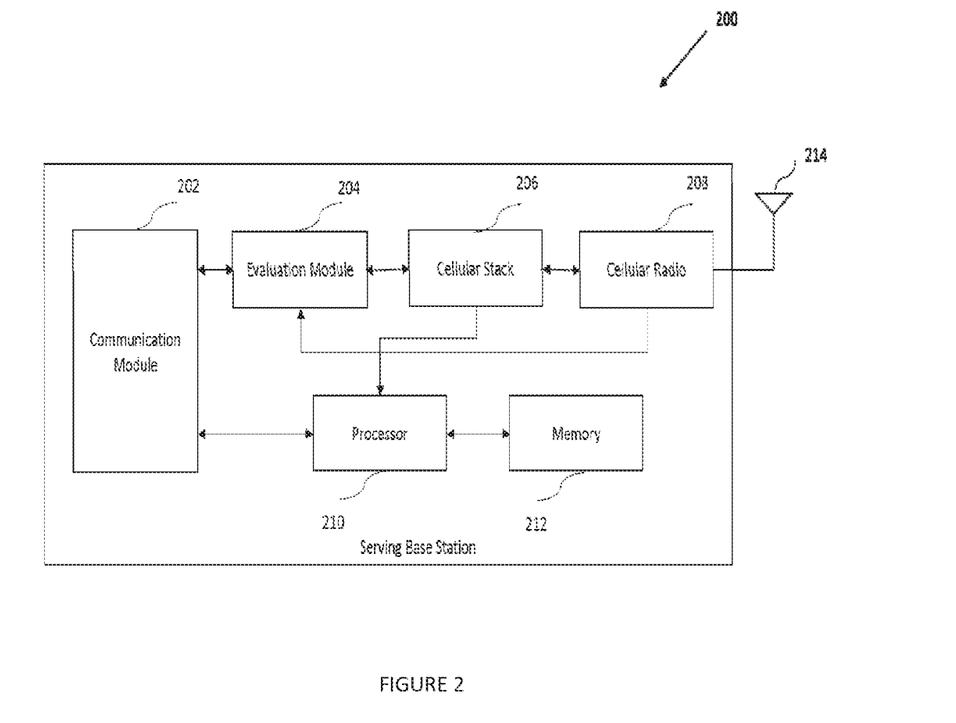
FIG. 2 illustrates an exemplary serving base station system [200] deployed in the heterogeneous network for resolving physical cell identity confusion, in accordance with an embodiment of the present disclosure.

As illustrated in FIG. 2, the present disclosure encompasses a system architecture [200] for the exemplary serving base station [102], comprising: a communication module [202], an evaluation module [204], a cellular stack [206], a cellular radio [208] connected with an antenna [214], a processor [210], and a memory [212].

The communication module [202] of the serving base station [102] may be configured to receive the handover request, the first physical cell identity of the first target base station [120A], and one or more identifiers of one or more access points [130A, 130B, 130C, 130D] from the user equipment [140].

The communication module [202] of the serving base station [102] may include a transmission/reception radio frequency (RF) antenna, communicatively coupled to a modulation/demodulation circuit configured to extract information from RF signals received via the RF antenna and provide it to processor [210], or encode information received from processor [210] into the RF signals transmitted by the RF antenna. In some embodiments, communication module [202] of the serving base station [102] may be implemented using cellular radio [208] connected to antenna [214]. The communication module [202] of the serving base station [102] may be configured to transmit the one or more identifiers of one or more access points [130A, 130B, 130C, 130D] to the first target base station [120A] and the second target base station [120B]. Further, the communication module [202] of the serving base station [102] may also be configured to receive the response messages from the first target base station [120A] and the second target base station [120B].

The evaluation module [204] of the serving base station [102] may be implemented via processor [210] executing instructions stored in memory [212]. The evaluation module [204] may be configured to compare the first physical cell identity (e.g. 102) of the first target base station [120A] with the neighbour list of the serving base station [102] and identify the physical cell identify confusion in an event the physical cell identity (e.g. 102) of the first target base station [120A] is same as that of the neighbour list of the first serving base station [102]. Further, the evaluation module [204] of the serving base station [102] may be configured to analyse the response messages from the first target base station [120A] and the second target base station [120B] to resolve the identified physical cell identify confusion by evaluating the positive response message including the non-empty list of the identifiers and the negative response message including the empty list. Further, the evaluation module [204] and the processor [210] may be connected with each other and the processor [210] is configured to work with the evaluation module [204] to process the comparison and evaluation decisions.

The processor [210] as used herein may include, but is not limited to, processor or set of processors configured to perform operations, such as, for example, a microprocessor, a multi-core microprocessor, a digital signal processor, a collection of electronic circuits, or a combination thereof.

The cellular radio [208] may be connected to the antenna [214] for receiving communication signals with other base stations and works with the cellular stack [206]. The cellular radio may be selected from a wide range of frequency bands such as frequency bands ranging from 1800 MHz, 2100 MHz and 2300 MHz.

The memory [212] may be configured to store and maintain the neighbour list of the serving base station. The memory [212] may include, but is not limited to, a volatile memory, non-volatile memory, a remote storage, a cloud storage, high-speed random access memory and/or non-volatile memory, such as one or more magnetic disk storage devices, one or more optical storage devices, and/or flash memory (e.g., NAND, NOR) or a combination thereof.

Further, all the components as used herein of the system architecture for the serving base station [102] may share common configuration and specification with the components of the first target base station [120A] and the second target base station [120B].

Figure 3:
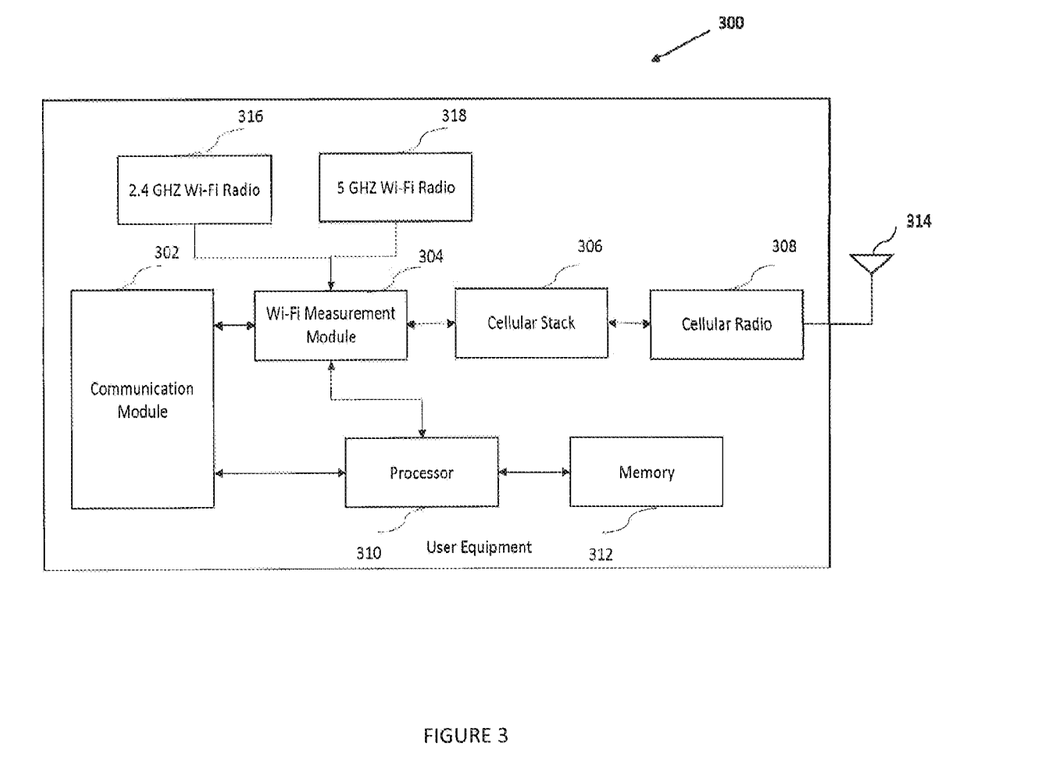
FIG. 3 illustrates an exemplary user equipment system [300] deployed in the heterogeneous network, in accordance with an embodiment of the present disclosure.

As illustrated in FIG. 3, the present disclosure encompasses a system architecture [300] for the exemplary user equipment [140], comprising: a communication module [302], a Wi-Fi measurement module [304], a cellular stack [306], a cellular radio [308] connected with an antenna [314], a processor [310], a memory [312], a 2.4 GHZ Wi-Fi Radio [316] and a 5 GHZ Wi-Fi Radio [318]. The 2.4 GHZ Wi-Fi Radio [316] and the 5 GHZ Wi-Fi Radio [318] of the user equipment [140] may be configured to provide Wi-Fi capability to the user equipment [140] on both licensed and unlicensed bands and may be configured to operate in a frequency band of 2.4 GHZ to 5 GHZ.

The communication module [302] of the user equipment [140] may be configured to transmit the handover request, the first physical cell identity of the first target base station [120A], and one or more identifiers of one or more access points [130A, 130B, 130C, 130D] to the serving base station [102].

The Wi-Fi measurement module [304] may be configured to measure signal strength from the serving base station [102], one or more access points [130A, 130B, 130C, 130D] connected to the first target base station [120A] and the second target base station [120B]. The Wi-Fi measurement module [304] may also be configured to compare signal strength with a pre-determined threshold for taking a decision for handover requirement from the serving base station [102] to one of the first target base station [120A] and the second target base station [120B]. The Wi-Fi measurement module [304] may also be configured to receive the at least one of a detection threshold, a freshness interval information, a radio channel information, and a scanning interval information of the at least one access point from the serving base station [102] via dedicated or broadcast signalling channels. Further, the Wi-Fi measurement module [304] and the processor [310] may be connected with each other and the processor [310] may be configured to work with the Wi-Fi measurement module [304] to process the evaluation decision.

The processor [310] as used herein may include, but are not limited to, processor or set of processors configured to perform operations, such as, for example, a microprocessor, a multi-core microprocessor, a digital signal processor, a collection of electronic circuits, or a combination thereof.

The cellular radio [308] may be connected to the antenna [314] for receiving communication and cellular signals with other nearby target base stations and works with the cellular stack [306].

The memory [312] may be configured to store and maintain the neighbour list of the serving base station. The memory [312] may include, but are not limited to, a volatile memory, non-volatile memory, a remote storage, a cloud storage, high-speed random access memory and/or non-volatile memory, such as one or more magnetic disk storage devices, one or more optical storage devices, and/or flash memory (e.g., NAND, NOR) or a combination thereof.

Figure 4:
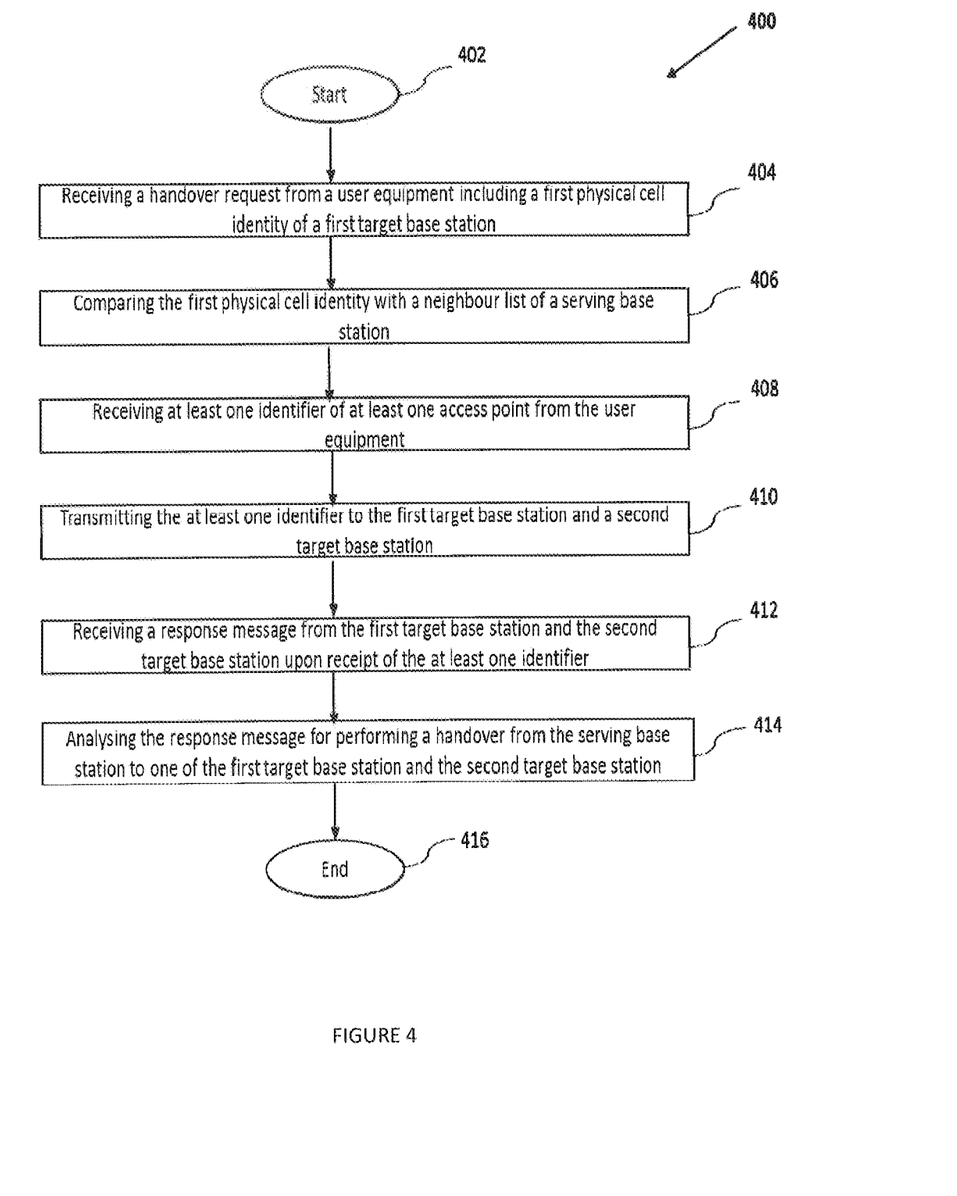
FIG. 4 illustrates an exemplary method flow diagram [400] comprising the method steps being performed by the serving base station with an embodiment of the present disclosure.

As illustrated in FIG. 4, the present disclosure encompasses an exemplary method [400] for resolving physical cell identity confusion at the serving base station [102]. The following includes detailed steps involved in resolving physical cell identity confusion, wherein the method step initiates at step 402.

At step 404, the serving base station [102] may receive the handover request from the user equipment [140] for performing handover from the serving base station [102] to the first target base station [120A]. The handover request may further include the first physical cell identity of the first target cell [120A]. The first physical cell identity of the first target cell [120A] for example may be 102.

At step 406, the first physical cell identity (e.g. 102) of the first target cell [120A] may be compared with the neighbour list of the serving base station [102]. The first physical cell identity and the second physical cell identity may for example be the same i.e. 102. After comparing, the serving base station [102] may identify that the received first physical cell identity (e.g. 102) from the user equipment [140] matches with the neighbour list of the serving base station [102] having the first physical cell identity (e.g. 102) of the first target base station [120A] and the second physical cell identity (e.g. 102) of the second target base station [120B]. As a result, the serving base station [102] may detect a physical cell identity confusion due to having similar physical cell identity of both the target base stations [120A, 120B].

At step 408, one or more identifiers [BSSID1, HSSID1, ESSID1] of access point [130A] may be received from the user equipment [140] in a measurement report. The one or more identifiers [BSSID1, HSSID1, ESSID1] may be transmitted either periodically or along with the handover request.

At step 410, the one or more identifiers (BSSID1, HSSID1, ESSID1) of access point [130A] received from the user equipment [140] may be transmitted to the first target base station [120A] and the second target base station [120B].

At step 412, the serving base station [102] may receive the response messages from the first target base station [120A] and the second target base station [120B]. The response messages may include the positive response message or the negative response message.

At step 414, the serving base station [102] may start analysing the positive response message and negative response message received from the first target base station [120A] and the second target base station [120B] after receiving response messages from each target base station [120A, 120B]. In an exemplary embodiment, the serving base station [102] may receive the positive response message from the first target base station [120A] and the negative response message from the second target base station [120B]. After the serving base station [102] analyses that positive response message received from the first target base station [120A] with the non-empty list of identifiers (BSSID1, HSSID1, ESSID1) of access point [130A] and the negative response message from the second target base station [120B] with the empty list, the serving base station [102] may identify the first target base station [120A] as a target base station for which the user equipment [140] has sent the handover request indicating the first physical cell identity (e.g. 102) of the first target cell [120A]. Accordingly, the serving base station [102] may resolve the physical cell identity confusion and perform the handover of the user equipment [140] to the first target cell [120A]. At step 416, the method [400] may terminate with performing the handover of the user equipment [140] from the serving base station [102] to the first target cell [120A].

Figure 5:
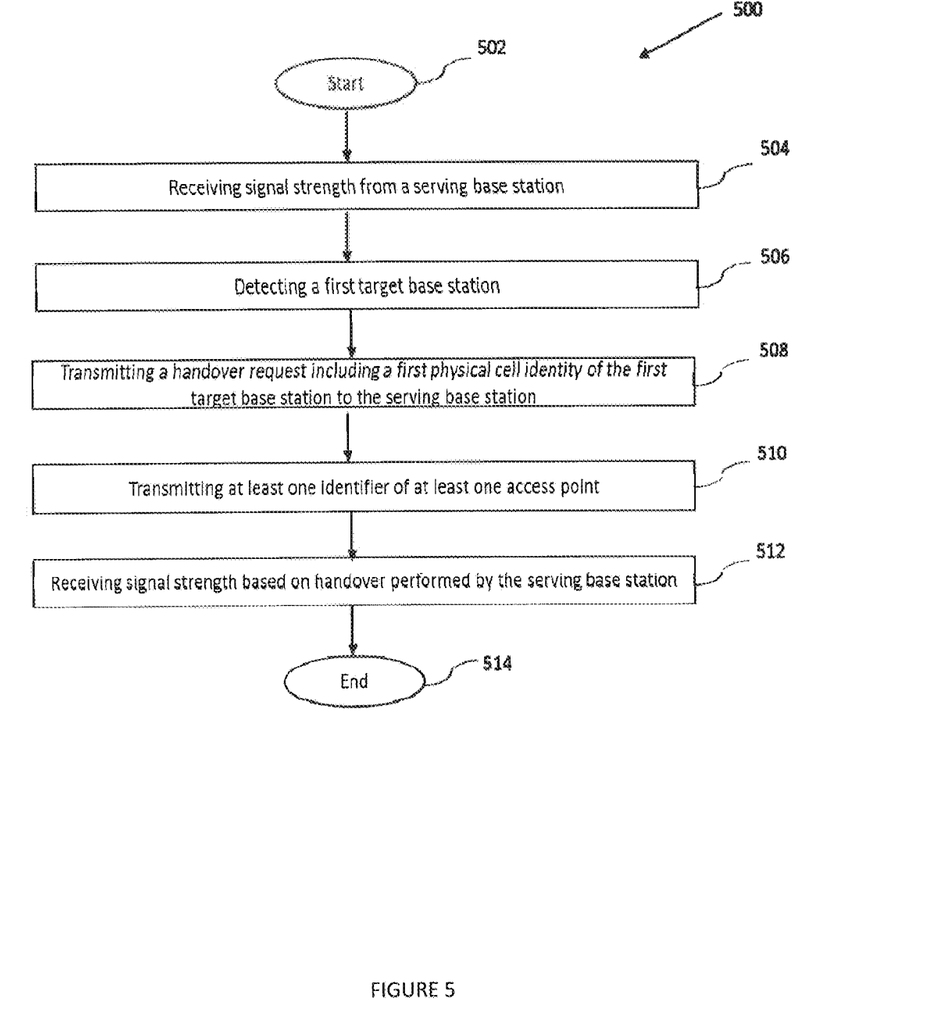
FIG. 5 illustrates an exemplary method flow diagram [500] comprising the method steps being performed by the user equipment with an embodiment of the present disclosure.

As illustrated in FIG. 5, the present disclosure encompasses an exemplary method [500] for resolving physical cell identity confusion at the user equipment [140]. The following includes detailed steps involved in resolving physical cell identity confusion, wherein the method step may initiate at step 502.

At step 504, the user equipment [140] may be connected to the serving base station [102] and receiving signal from the serving base station [102].

At step 506, the user equipment [140] may detect signal from access point [130A] connected to the first target base station [120A] in an event the user equipment [140] moves towards the first target base station [120A].

At step 508, the user equipment [140] may transmit the handover request to the serving base station [102] for performing handover from the serving base station [102] to the first target base station [120A], in an event the user equipment [140] starts receiving signal from access points [130A] connected to the first target base station [120A], beyond a predetermined threshold.

At step 510, the user equipment [140] may transmit one or more identifiers [BSSID1, HSSID1, ESSID1, explained in detail above] of access point [130A] to the serving base station [102] in the measurement report. The one or more identifiers [BSSID1, HSSID1, ESSID1] may be transmitted either periodically or along with the handover request.

At step 512, the user equipment [140] may start receiving signal strength based handover performed by the serving base station [102]. The method 500 may terminate at step 514.

Figure 6:
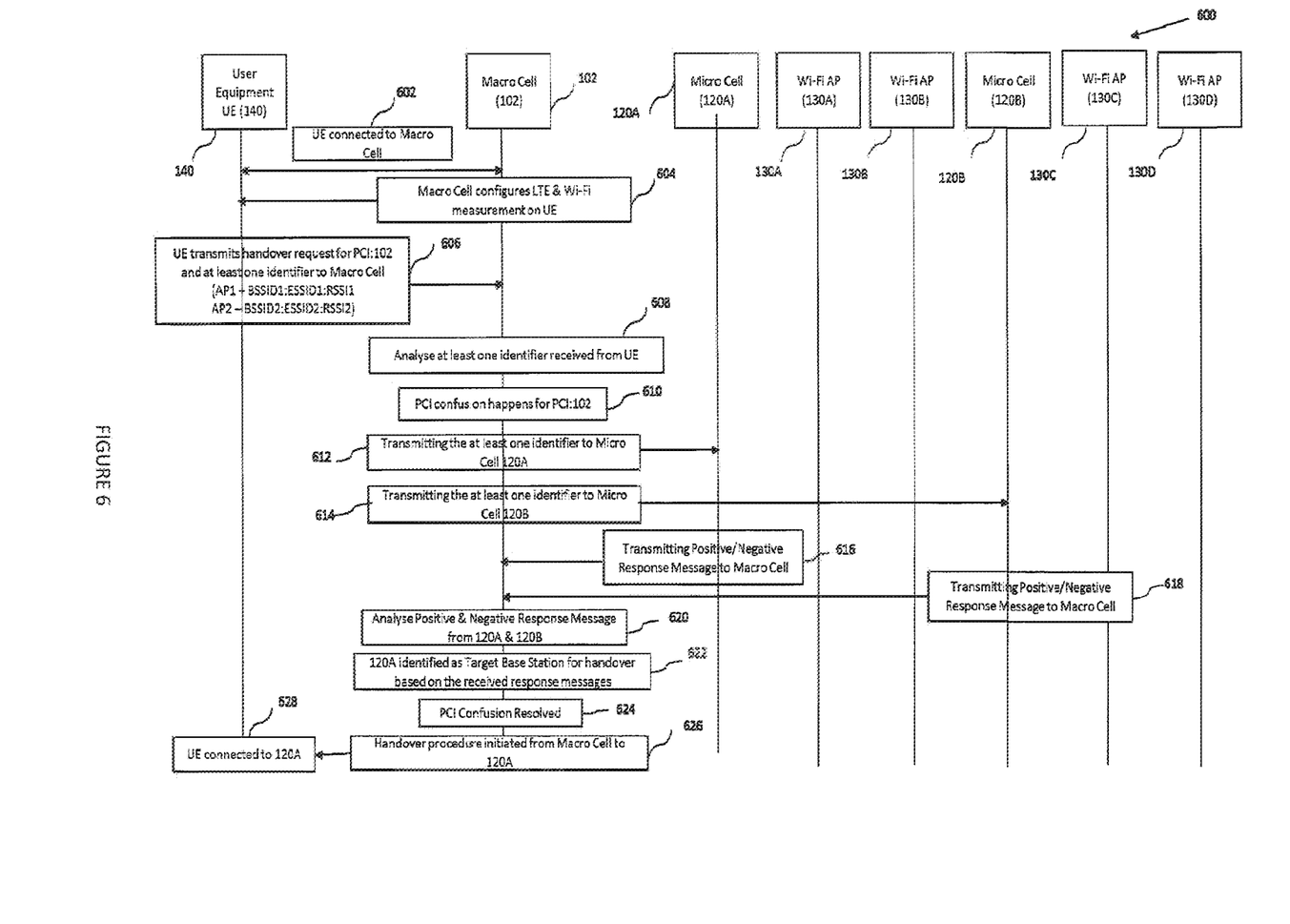
FIG. 6 illustrates an exemplary signaling flow diagram [600] in accordance with an embodiment of the present disclosure.

FIG. 6 illustrates an exemplary embodiment of the present disclosure that encompasses an exemplary method [600] flow signalling diagram for resolving physical cell identity confusion. The following steps describe the implementation architecture details of the resolving physical cell identity confusion:

At step 602, the user equipment [140] may connect to the serving base station [102].

At step 604 and pursuant to accomplishment of step 602, the serving base station [102] may configure the cellular/Wi-Fi measurement capabilities and requirements on the user equipment [140].

At step 606, the user equipment [140] may transmit the handover request to the serving base station [102] for performing handover from the serving base station [102] to the first target base station [120A]. The handover request may further include the first physical cell identity of the first target cell [120A]. The first physical cell identity of the first target cell [120A], for example may be 102. Further, the user equipment [140] may transmit one or more identifiers [BSSID1, HSSID1, ESSID1, explained in detail above] of access point [130A] to the serving base station [102] in the measurement report. The one or more identifiers [BSSID1, HSSID1, ESSID1] may be transmitted either periodically or along with the handover request.

At step 608, the serving base station [102] may analyse one or more identifiers [BSSID1, HSSID1, ESSID1] of access point [130A] and the received the first physical cell identity of the first target cell [120A] by comparing it with the neighbour list of the serving base station [102].

At step 610, the serving base station [102] may detect the physical cell identity confusion as the received first physical cell identity of the first target cell [120A] is same as the physical cell identity of the cell [120B] in the neighbour list of the serving base station [102].

At step 612, the serving base station [102] may transmit the one or more identifiers (BSSID1, HSSID1, ESSID1) of access point [130A] received from the user equipment [140] to the first target base station [120A].

At step 614, the serving base station [102] may transmit the one or more identifiers (BSSID1, HSSID1, ESSID1) of access point [130A] received from the user equipment [140] to the second target base station [120B].

At step 616, on receiving the one or more identifiers (BSSID1, HSSID1, ESSID1) of access point [130A] from the serving base station [102], the first target base station [120A] may allocate the response message to the one or more identifiers (BSSID1, HSSID1, ESSID1) received from the serving base station [102]. Subsequently, the first target base station [120A] may compare the one or more identifiers (BSSID1, HSSID1, ESSID1) of access point [130A] with the first neighbour list of the first target base station [120A]. As the one or more identifiers (BSSID1, HSSID1, ESSID1) received from the user equipment [140] matches with the first neighbour list of the first target base station [120A], the first target base station [120A] may transmit the positive response message to the serving base station [102] including the non-empty list of identifiers (BSSID1, HSSID1, ESSID1) of access point [130A].

At step 618, the second target base station [120B], may allocate the response message to the one or more identifiers (BSSID1, HSSID1, ESSID1) of the access point [130A] received from the serving base station [102] and may compare the one or more identifiers (BSSID1, HSSID1, ESSID1) of access point [130A] with the second neighbour list of the second target base station [120B]. In an event the one or more identifiers (BSSID1, HSSID1, ESSID1) received from the user equipment [140] does not matches with the second neighbour list of the second target base station [120B], the second target base station [120B] may transmit the negative response message to the serving base station [102] including the empty list.

At step 620, the serving base station [102] may start analysing the positive response message and negative response message received from the first target base station [120A] and the second target base station [120B] after receiving response messages from each target base station. In an exemplary embodiment, the serving base station [102] may receive the positive response message from the first target base station [120A] and the negative response message from the second target base station [120B].

At step 622, after the serving base station [102] analyses that positive response message received from the first target base station [120A] with the non-empty list of identifiers (BSSID1, HSSID1, ESSID1) of access point [130A] and the negative response message from the second target base station [120B] with the empty list, the serving base station [102] may identify the first target base station [120A] as a target base station for which the user equipment [140] has sent the handover request indicating the first physical cell identity (e.g. 102) of the first target cell [120A].

At step 624, the serving base station [102] may resolve the physical cell identity confusion.

At step 628, the serving base station [102] may perform the handover of the user equipment [140] to the first target cell [120A].

Figure 7:
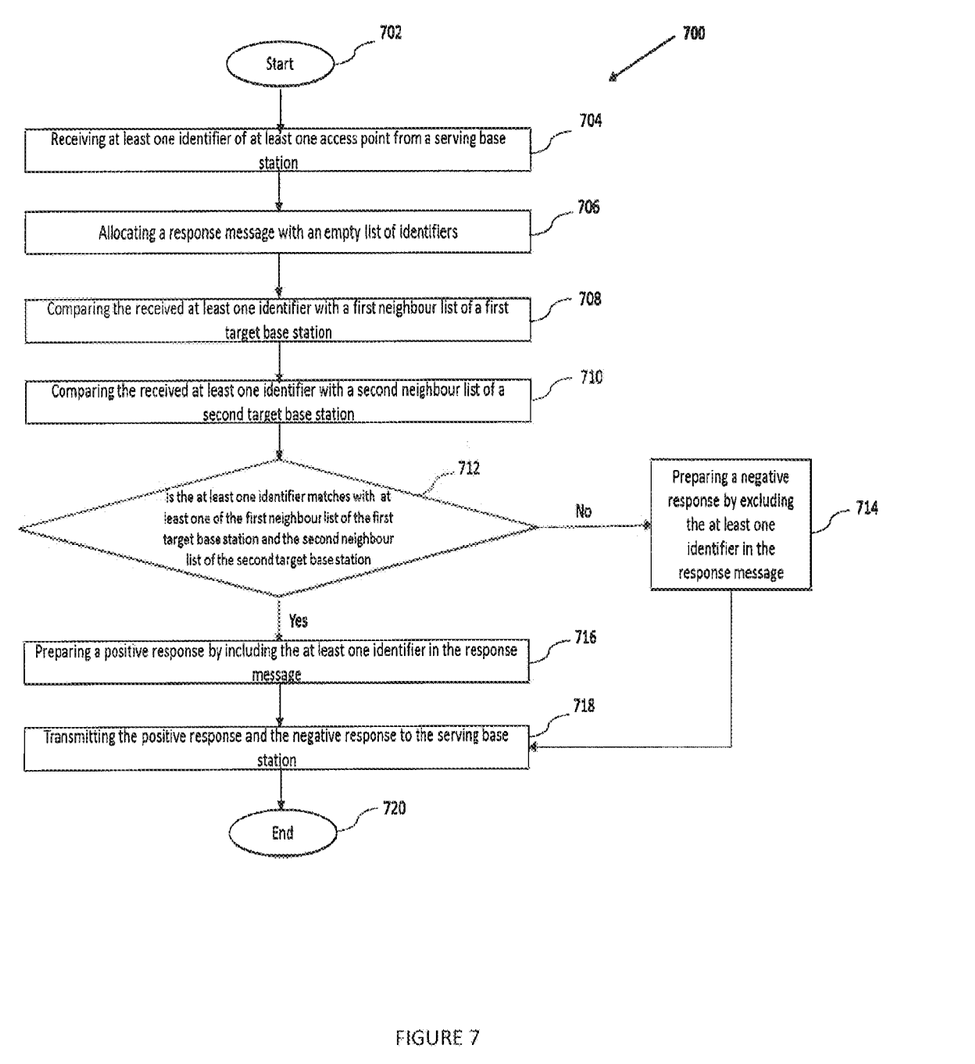
FIG. 7 illustrates an exemplary method flow diagram [700] which is being performed by the target base stations with an embodiment of the present disclosure.

As illustrated in FIG. 7, the present disclosure encompasses an exemplary method [700] being performed by at least one of the first target base station [120A] and the second target base station [120B]. The following includes detailed steps involved in resolving physical cell identity confusion, wherein the method step may initiate at step 702.

At step 704, the one or more identifiers (BSSID1, HSSID1, ESSID1) of access point [130A] from the serving base station [102] may be received.

At step 706, the first target base station [120A] and the second target base station [120B] may allocate the response messages to the one or more identifiers (BSSID1, HSSID1, ESSID1) of access point [130A] received from the serving base station [102].

At step 708, the first target base station [120A] may compare the one or more identifiers (BSSID1, HSSID1, ESSID1) of access point [130A] with the first neighbour list of the first target base station [120A].

At step 710, the second target base station [120B] may compare the one or more identifiers (BSSID1, HSSID1, ESSID1) of access point [130A] with the second neighbour list of the second target base station [120B].

At step 712, the first target base station [120A] and the second target base station [120A] may determine if the one or more identifiers (BSSID1, HSSID1, ESSID1) matches with at least one of the first neighbour list of the first target base station and the second neighbour list of the second target base station. In response to the determination of a match, the method [700] may proceed to step 716 and in response to the determination of no match, the method [700] may proceed to step 714.

At step 714, if the one or more identifiers (BSSID1, HSSID1, ESSID1) of access point [130A] does not match with at least one of the first neighbour list of the first target base station and the second neighbour list of the second target base station, target base stations [120A] and [120B] may prepare a negative response message by excluding one or more identifiers (BSSID1, HSSID1, ESSID1) of access point [130A] in the response message.

At step 716, if the one or more identifiers (BSSID1, HSSID1, ESSID1) matches with at least one of the first neighbour list of the first target base station and the second neighbour list of the second target base station, corresponding target base station [120A] or [120B] may prepare a positive response message by including one or more identifiers (BSSID1, HSSID1, ESSID1) of access point [130A] in the response message.

At step 718, target base stations [120A] and [120B] may transmit the positive response message and the negative response message to the serving base station [102]. Then, the method [700] may end at step 720.

Figure 8:
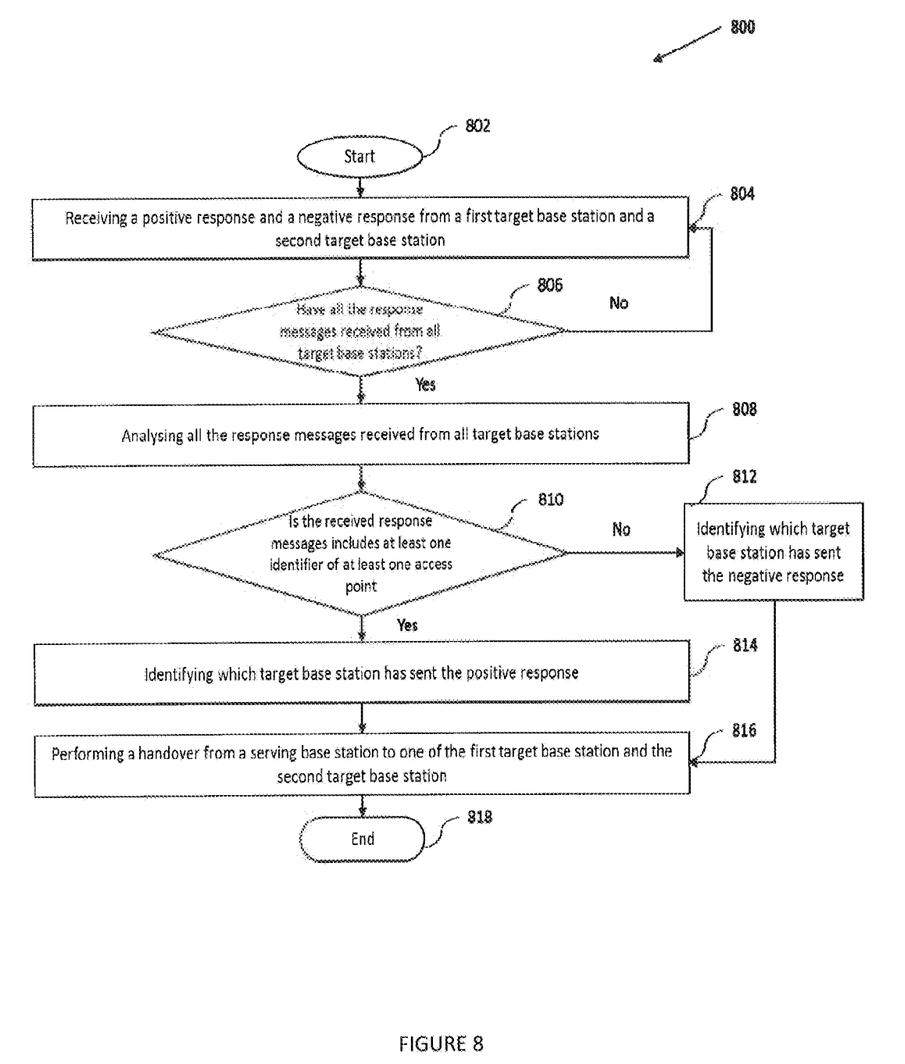
FIG. 8 illustrates an exemplary method flow diagram [800] which is being performed by the serving base station with an embodiment of the present disclosure.

As illustrated in FIG. 8, the present disclosure encompasses an exemplary method [800] for resolving physical cell identity confusion at the serving base station [102]. The following includes detailed steps involved in resolving physical cell identity confusion, wherein the method step may initiate at step 802.

At step 804, the serving base station [102] may receive response messages from the first target base station [120A]

and the second target base station [120B]. The response messages may include positive response message and negative response message.

At step 806, the serving base station [102] may check if each target base station has sent a response message. If yes, the method 800 may proceed to step 808, otherwise the method 800 may step back to step 804.

At step 808, the serving base station [102] may start analysing the positive response message and the negative response message received from the first target base station [120A] and the second target base station [120B].

At step 810, the serving base station [102] may check if the positive response message and negative response message received from the first target base station [120A] and the second target base station [120B] includes the one or more identifiers (BSSID1, HSSID1, ESSID1) of access point [130A]. If yes, then the method 800 may proceed to step 814, else the method may proceed to step 812.

At step 812, the serving base station [102] may identify from which target base station, the negative response message has been received. In an exemplary embodiment, the second target base station [120B] may have sent the negative response message to the serving base station [102].

At step 814, the serving base station [102] may identify from which target base station, the positive response message has been received. In an exemplary embodiment, the first target base station [120A] may have sent the positive response message to the serving base station [102].

At step 816, the serving base station [102] may perform the handover of the user equipment [140] from the serving base station [102] to one of the first target cell [120A] and the second target base station [120B] from which the positive response message has been received. In an exemplary embodiment, the serving base station [102] may perform the handover of the user equipment [140] to the first target cell [120A].

Although, the present disclosure has been described with respect to the example cited above where the user equipment [140] approaches and detects signals from the access point [130A] which is connected to the first target base station [120A], however, it will be appreciated by those skilled in the art that the present disclosure is also applicable in scenarios when the user equipment [140] approaches and detects signals from any access point [130A, 130B, 130C, 130D] which are connected any target base stations available nearby such as the first target base station [120A] and the second target base station [120B].

Though a limited number of the first target base station [120A], the second target base station [120B], the user equipment [140], the access points [130A, 130B, 130C, 130D] and the link/connection/interfaces, have been shown in the figures; however, it will be appreciated by those skilled in the art that the system [100] of the present disclosure encompasses any number and varied types of the entities/elements such as the interfaces, the user equipment [140], the access points [130A, 130B, 130C, 130D], the first target base station [120A], and the second target base station [120B].

While considerable emphasis has been placed herein on the disclosed embodiments, it will be appreciated that many embodiments can be made and that many changes can be made to the embodiments without departing from the principles of the present disclosure. These and other changes in the embodiments of the present disclosure will be apparent to those skilled in the art, whereby it is to be understood that the foregoing descriptive matter to be implemented is illustrative and non-limiting.

We claim:

1. A method for resolving physical cell identity confusion, the method being performed by a serving base station, the method comprising:
    receiving a handover request from a user equipment, wherein the handover request includes a first physical cell identity of a first target base station, and the user equipment is connected to the serving base station;
    comparing the first physical cell identity with a neighbour list of the serving base station,
        wherein the neighbour list comprises the first physical cell identity of the first target base station and a second physical cell identity of a second target base station;
    receiving at least one identifier of at least one access point from the user equipment;
    transmitting the at least one identifier to the first target base station and the second target base station;
    receiving a response message from each of the first target base station and the second target base station after transmitting the at least one identifier,
        wherein the response message comprises one of a positive response and a negative response based on a comparison of the at least one identifier; and
    analysing said response message for performing a handover from the serving base station to one of the first target base station and the second target base station based on the positive response and the negative response received from the first target base station and the second target base station.

2. The method as claimed in claim 1, wherein the at least one access point is connected to one of the first target base station and the second target base station.

3. The method as claimed in claim 1, wherein the at least one identifier comprises at least one of a basic service set identifier, a heterogeneous extended service set identifier, or an extended service set identifier of the at least one access point.

4. The method as claimed in claim 1, further comprising:
    transmitting at least one of a detection threshold, a freshness interval information, a radio channel information, and a scanning interval information of the at least one access point to the user equipment for detecting at least one identifier.

5. The method as claimed in claim 1, wherein receiving the positive response from at least one of the first target base station and the second target base station comprises:
    receiving the response message including the at least one identifier from at least one of the first target base station and the second target base station, wherein the at least one identifier matches with at least one identifier included in one of the first neighbour list of the first target base station and the at least one identifier included in the second neighbour list of the second target base station.

6. The method as claimed in claim 1, wherein receiving the negative response from at least one of the first target base station and the second target base station comprises:
    receiving the response message excluding the at least one identifier from at least one of the first target base station and the second target base station wherein the at least one identifier is absent from at least one of the first neighbour list of the first target base station and the second neighbour list of the second target base station.

7. The method as claimed in claim 1 further comprising:
    transmitting at least one of a detection threshold, a freshness interval information, a radio channel information, and a scanning interval information of the at least one access point to the user equipment for detecting at least one identifier.

8. The method as claimed in claim 1, wherein the serving base station receives the positive response from at least one of the first target base station and the second target base station comprising:
the serving base station receiving the response message including the at least one identifier from at least one of the first target base station and the second target base station, wherein the at least one identifier matches with the at least one identifier included in the first neighbour list of the first target base station or at least one identifier included in the second neighbour list of the second target base station.

9. The method as claimed in claim 1 wherein the serving base station receives the negative response from at least one of the first target base station and the second target base station comprising:
the serving base station receiving the response message excluding the at least one identifier from at least one of the first target base station and the second target base station, wherein in an event the at least one identifier is absent from at least one of the first neighbour list of the first target base station and the second neighbour list of the second target base station.

10. A serving base station system for resolving physical cell identity confusion, the serving base station comprising:
receive a handover request from a user equipment, wherein
the handover request includes a first physical cell identity of a first target base station, and
the user equipment is connected to the serving base station,
receive at least one identifier of at least one access point from the user equipment,
transmit the at least one identifier to the first target base station and a second target base station,
receive a response message from each of the first target base station and the second target base station after transmitting the at least one Identifier, wherein
the response message comprises one of a positive response and a negative response based on a comparison of the at least one identifier; and
an evaluation module configured to:
compare the first physical cell identity with a neighbour list of the serving base station, wherein
the neighbour list comprises the first physical cell identity of the first target base station and a second physical cell identity of the second target base station; and
analyse the response message for performing a handover from the serving base station to one of the first target base station and the second target base station based on the positive response and the negative response received from the first target base station and the second target base station.

* * * * *